United States Patent [19]
Berland et al.

[11] Patent Number: 5,497,326
[45] Date of Patent: Mar. 5, 1996

[54] INTELLIGENT COMMUTATION PULSE DETECTION SYSTEM TO CONTROL ELECTRIC D.C. MOTORS USED WITH AUTOMOBILE ACCESSORIES

[75] Inventors: Kerry Berland, Chicago; Jeff Kaul, Arlington Heights; Mitchell Budniak, Highland Park, all of Ill.

[73] Assignee: The Cherry Corporation, Waukegan, Ill.

[21] Appl. No.: 285,310

[22] Filed: Aug. 3, 1994

[51] Int. Cl.⁶ .............................. G05B 23/02; G05G 5/04
[52] U.S. Cl. ........................ 364/424.05; 49/28; 364/483; 318/468
[58] Field of Search ............... 364/424.05, 424.01, 364/483, 571.02, 155, 176; 307/9.1, 10.1; 296/65.1; 318/467, 468, 470, 476, 478, 264, 265, 266; 49/26, 28

[56] References Cited

U.S. PATENT DOCUMENTS

| | | | |
|---|---|---|---|
| 4,204,255 | 5/1980 | Cremer | 364/424.05 |
| 4,404,632 | 9/1983 | Harada et al. | 364/424.05 |
| 4,434,468 | 2/1984 | Caddick et al. | 364/424.05 |
| 4,451,887 | 5/1984 | Harada et al. | 364/424.05 |
| 4,463,426 | 7/1984 | Caddick et al. | 364/424.05 |
| 4,510,426 | 4/1985 | Michaels et al. | 318/565 |
| 4,523,136 | 6/1985 | Dudeck et al. | 318/568 |
| 4,686,598 | 8/1987 | Herr | 361/31 |
| 4,706,194 | 11/1987 | Webb et al. | 364/424.05 |
| 4,707,788 | 11/1987 | Tashiro et al. | 364/424.05 |
| 4,811,226 | 3/1989 | Shinohara | 364/424.05 |
| 4,822,093 | 4/1989 | Kawai et al. | 296/65.1 |
| 4,823,059 | 4/1989 | Compeau et al. | 318/454 |
| 4,845,620 | 7/1989 | Parker | 364/424.05 |
| 4,900,079 | 2/1990 | Obara et al. | 296/65.1 |
| 4,907,153 | 3/1990 | Brodsky | 364/424.05 |
| 4,909,560 | 3/1990 | Ginn | 296/65.1 |
| 4,980,618 | 12/1990 | Milnes et al. | 318/265 |
| 5,069,000 | 12/1991 | Zuckerman | 49/28 |
| 5,179,328 | 1/1993 | Furuse et al. | 318/603 |
| 5,197,007 | 3/1993 | Parker | 364/424.05 |
| 5,204,592 | 4/1993 | Huyer | 318/466 |
| 5,218,282 | 6/1993 | Duhame | 318/603 |
| 5,334,876 | 8/1994 | Washeleski et al. | 307/10.1 |
| 5,399,950 | 3/1995 | Lu et al. | 318/565 |

OTHER PUBLICATIONS

Martin, Norman, "Anti-Trap in a Jam," *Automotive Industries*, Jun. 1994.

*Primary Examiner*—Michael Zanelli
*Attorney, Agent, or Firm*—Willian Brinks Hofer Gilson & Lione

[57] ABSTRACT

A control system for use with a bidirectional motor connected to a motorized vehicle accessory to move the accessory a distance from a first position to a second position. The control system includes a detector responsive to control signals emitted from the motor during rotation, where the control signals indicate the amount of motor rotation. The control system also includes a memory that stores information used to represent the position of the accessory. Additionally, this control system includes a controller responsive to the memory and the detector. The controller provides an output signal to operate the motor based on the distance between a first position and a second position of the accessory as well as control signals that indicate the amount of motor rotation. The controller includes an adjustment routine that determines a correction factor that is applied to the output signal to compensate for inaccuracies in control signal detection.

29 Claims, 9 Drawing Sheets

CHECK—CROSS—TALK

FIG.IIA

FIG.IIB

FIG.IIC

FIG.IID

INTELLIGENT COMMUTATION PULSE DETECTION SYSTEM TO CONTROL ELECTRIC D.C. MOTORS USED WITH AUTOMOBILE ACCESSORIES

BACKGROUND OF THE INVENTION

The field of the invention relates to a control system for use with a bidirectional motor connected to vehicle accessories. More particularly, the system controls bidirectional electric d.c. motors that may be used with vehicle accessories such as power seats, power sunroofs, power mirrors, and power windows.

Modern automobiles include electric d.c. motors to control many vehicle accessories, thereby increasing the quality, convenience, and safety of automobile ownership and operation. Power accessories allow an automobile user to conveniently access automobile features and often provide a safety function to protect the automobile's occupants. An automobile user may conveniently activate many functions such as opening a window or adjusting a mirror with a simple push of a button.

For example, power seats are sometimes provided with a memory feature that permits a driver to have an electric motor automatically adjust the power seat to a previously set position. This feature enables several users, e.g. a husband and wife, to each store his or her own personal preferred seat adjustment position. Thereafter, the seat automatically adjusts to a position previously stored by that user when one of the drivers first enters the vehicle and activates the appropriate control.

This feature for automobile seats may require a memory capable of storing information corresponding to a first position of the seat, i.e. the current position, and a second position of the seat, i.e. the desired position. This memory may also include data for the seat backrest angle, the seat bottom linear position, tilt position, and so on.

One prior method to obtain this data was to attach sensors, such as potentiometers, to the seat components for producing electrical signals indicative of the seat component's position. Potentiometers have been a reliable way to obtain information about the position of the various seat components; however, this method includes the added expense of providing and installing potentiometers.

An alternative method to obtain seat position information is to count the number of commutation pulses generated by the electric motor that moves the seat. Assuming the motor has a predetermined number of poles and that each revolution of the motor causes the seat to move a known distance, the seat position may be related to the number of commutation pulses generated by the motor controlling the seat. Using commutation pulses to obtain information about the position of a vehicle seat eliminates the need and added cost for separate potentiometers. One way to use commutation pulses is related in U.S. Pat. No. 4,463,426 ("the '426 patent").

However, using the number of commutation pulses to determine the actual position of the seat has disadvantages. Since commutation pulses provide only a relative position of the seat to an arbitrary starting point, any inaccuracy in the pulse detection system may cause the seat position stored in memory to drift over time to a noticeably incorrect representation of the actual seat position. The vehicle user must then re-enter the desired position into memory after engaging a selector to manually control the motor that moves the seat to the desired position. For the foregoing reasons there is a need for a commutation pulse detection system for controlling automobile accessories such as power seats with improved position accuracy.

An object of this invention is to provide an improved control system that reduces errors associated with seat position memory operation. Another object of this invention is to provide a control system that can estimate when errors have occurred. Another object of the invention is to provide an improved control system that solves the problems and removes deficiencies present in the prior art.

SUMMARY OF THE INVENTION

According to a first aspect of the present invention there is provided a control system and a method for use with a bidirectional motor connected to a motorized vehicle accessory to move the accessory a distance from a first position to a second position. The control system includes a detector responsive to control signals emitted from the motor during rotation, where the control signals indicate the amount of motor rotation. The control system also includes a memory that stores information indicative of the position of the accessory. Additionally, this control system includes a controller responsive to the memory and the detector. The controller provides an output signal to operate the motor based on the distance between a first position and a second position of the accessory as well as the control signals that indicate the amount of motor rotation. The controller includes a routine that develops an adjustment factor that modifies the output signal to correct for inaccuracies in control signal detection.

A further aspect of this invention is to provide new features which improve control of vehicle accessories by analyzing commutation waveforms associated with d.c. motors. One new feature is an automatic safety feature that will stop the motor when an obstruction is detected in the travel path of a vehicle accessory such as a sunroof. This feature utilizes commutation pulses to synchronously detect the level of the motor current, enabling motor load information to be extracted quickly and accurately. Another new feature is a speed control feature that slows the motor to decrease the inertia of an accessory attached to the motor such as a power window and thereby reduces the pinching force of the accessory as it nears an opposing window frame, allowing the control system to more rapidly reverse the window (or sunroof or other such accessory) in the event that an obstruction is detected.

Another new feature is a soft stop feature wherein the control system automatically brings the accessory to a stop just before a mechanical end limit (for example, seat full forward or full back), reducing wear on the motor and the mechanism.

These and other features, aspects, and advantages of the present invention will become better understood with regard to the following description, appended claims, and accompanying drawings.

DETAILED DESCRIPTION OF THE PREFERRED EMBODIMENTS

It has been observed that counting commutation pulses and relating the pulses to seat movement has been unreliable over time. Further, it has been noted that certain types of errors occur in a consistent manner, so that these errors accumulate over time resulting in a noticeably incorrect seat position stored in memory.

One of the reasons that errors occur in relating the count of commutation pulses to the seat position is that the commutation pulses may be masked or obscured in the waveform signal. A preferred embodiment of the invention is designed to correctly extract pulses from a commutation waveform and reduce errors occurring in counting the pulses or in relating the pulses to the seat movement.

Figure 1:
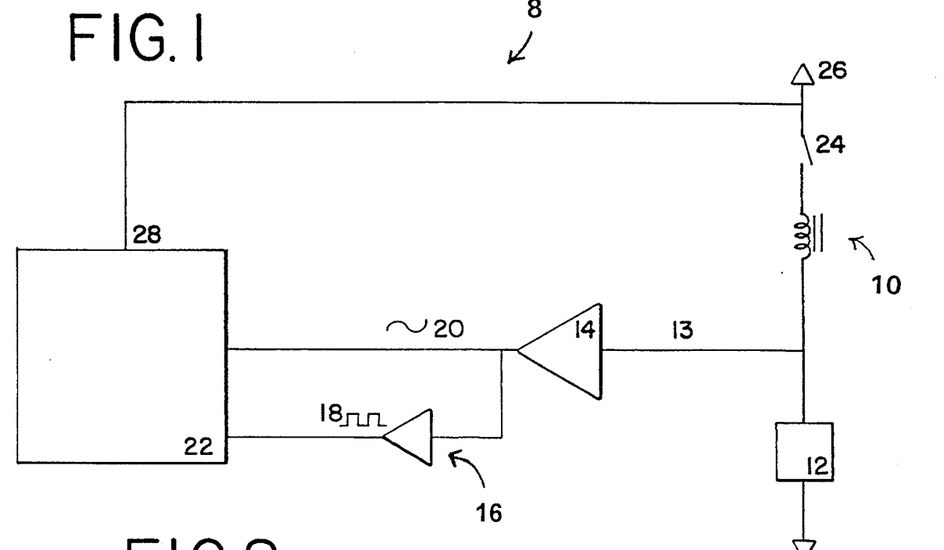
FIG. 1 is a diagram of the control system.

The diagram of FIG. 1 shows a control system 8. The control system 8 includes a motor 10 for controlling a motorized vehicle accessory such as a seat (seat accessory not shown). The motor 10 is a bidirectional motor constructed with a fixed number of poles and is powered by a d.c. power source 26. When supplied with power, the motor 10 rotates, travelling past each of its poles.

A current detector 12, such as a sense resistor or a transformer, is electrically coupled to the motor 10 to detect a commutation waveform containing current fluctuations where each fluctuation represents a pole traversed by the motor. The voltage drop across current detector 12, a control signal 13, is fed into an amplifier circuit 14. The amplifier circuit 14 amplifies the control signal 13 detected by the current detector 12 to a useable level. When the current detector 12 comprises a sense resistor, a resistance of about 10 to about 100 milliohms can be chosen to minimize power dissipation because amplifier 14 compensates for the low voltage level of control signal 13. Such combination of current detector 12 and amplifier 14 offers cost and size reductions.

The output of the amplifier 14 is directed to a comparator 16. The comparator 16 receives an amplified commutation waveform 20 from the amplifier 14 and generates a digital pulse train 18 at its output. The comparator 16 preferably generates the digital signal 18 by toggling its digital output each time the derivative of the commutation waveform 20 changes from a positive value to a negative value. The digital pulse train 18 is then fed into a controller 22.

The controller 22 processes information provided by the commutation waveform 20 from the amplifier 14 and the digital pulse train 18 from the comparator 16. The controller sends an output signal 28 to a relay 24 that drives the motor 10. The relay 24 is connected to a power source 26 for driving the motor 10 when activated by the output signal 28 from the controller 22. The controller 22 shown is a microprocessor.

Figure 2:
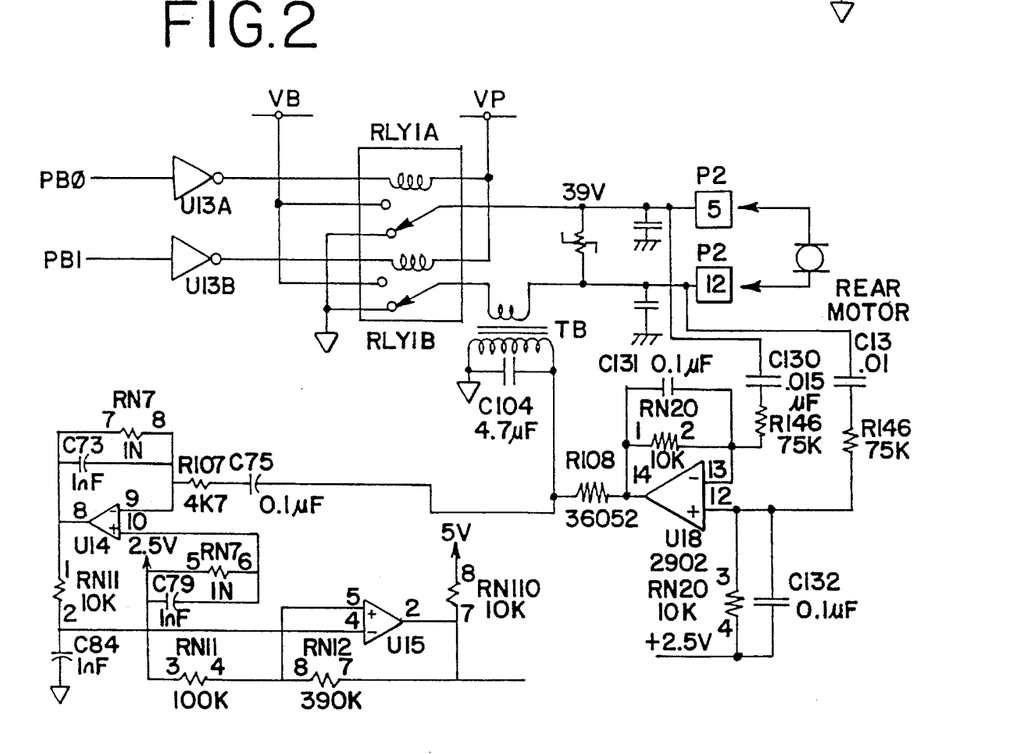
FIG. 2 is a schematic circuit for a multi-axis automotive accessory showing pulse detection circuitry and motor cross-talk limiting circuitry.

FIG. 2 shows a preferred embodiment of a circuit for controlling a motor for moving an automobile seat in a travel path. Four such control circuits may be combined to form a multi-axis system to control the seat in four different seat travel paths, e.g. horizontal, front, rear, and recline. Since all four circuits are substantially identical only one will be described in detail.

As shown in FIG. 2, outputs from the controller 22, PB0 and PB1 are connected through relay drivers U13A and U13B to dual motor controlling relays RLY1A and RLY1B. Normally the coils of both RLY1A and RLY1B are off, so both leads of the motor are connected together, and the rear motor is off. To run the rear motor in one direction, PB0 is turned on, and PB1 is kept off. PB0 actuates the coil of RLY1A, connecting the motor lead at P2-5 to VB (+12 volts). The other motor lead at P2-12 is connected by RLY1B to ground.

To stop the motor, the controller 22 switches off PB0 and PB1.

To run the motor in the opposite direction, the controller 22 keeps PB0 off, and switches on PB1. PB1 actuates the coil of RLY1B, connecting the motor lead at P2-12 to VB (+12 volts) while the other motor lead at P2-5 is connected to ground. Current now flows through the motor in a direction opposite to that previously described, reversing the motion of the motor.

A transformer T3, used as a current detector, has its primary winding electrically connected to the motor. A secondary winding of transformer T3 is connected through a d.c. blocking capacitor C75 to an input of an operational amplifier U14 used to amplify an analog commutation waveform sensed by the transformer T3. Capacitor C104 acts with the inductance of the secondary winding of transformer T3 to maximize the sensitivity of current detection to the frequency range of motor commutation pulses. A comparator U15 responsive to the output of amplifier U14 generates a digital pulse train 18 at the comparator output PA1. Output signal PA1 is then sent to the controller 22.

In this embodiment, the current detector 12 chosen comprises a transformer. Transformers are preferred in a multi-axis motorized system because, when suitably chosen, each transformer helps to reject voltage fluctuations on the battery feed line, generated by the other motors as they start and stop, which could interfere with detection of commutation pulses.

Figure 3:
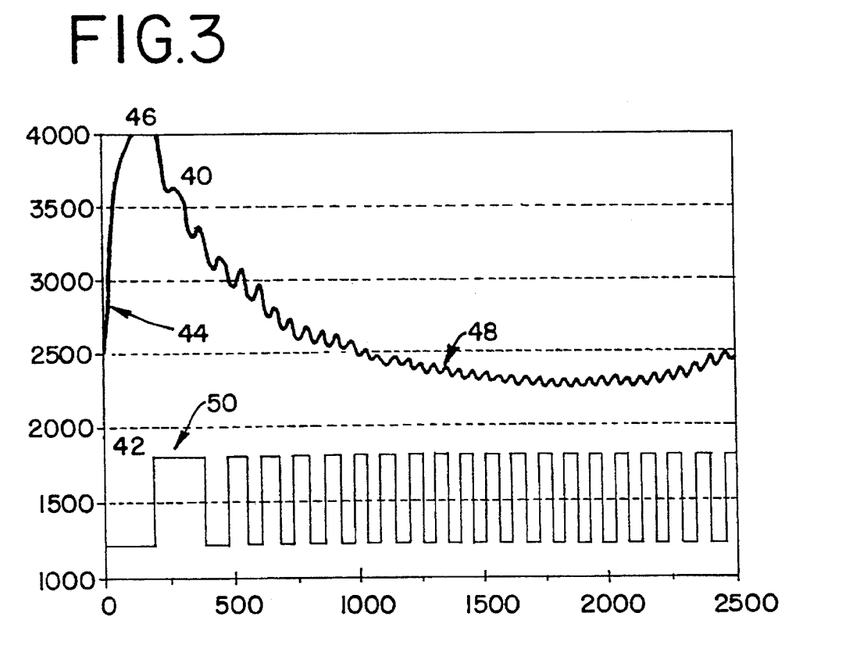
FIG. 3 is a graph of current versus time of a typical commutation waveform from a motor 10 of FIG. 1 and a typical digital pulse train 18 derived from said waveform of FIG. 1.

FIG. 3 shows a graph of two waveforms in a commutation pulse detection system. FIG. 3 shows a commutation pulse waveform 40 detected from the motor 10 based on current fluctuations and a digital pulse train 42 used by the controller 22 to count the number of poles traversed by the motor 10.

Data acquisition begins just after the motor 10 is turned on. At this stage 44, the motor current starts to rise. The motor 10, is effectively in a stalled condition when it is first turned on and inrush current rapidly rises to a peak 46. As the motor starts to move, the average current decreases to a steady state 48. The motor 10 generates commutation pulses, seen as fluctuations in the current waveform shown in FIG. 3, as its brushes switch from one motor pole to the next motor pole.

A second waveform 42 represents the output signal of a digital pulse generator that receives the amplified current waveform 20 at its input and toggles a digital output each time that the first derivative of the analog signal changes direction from positive to negative. The digital pulse generator includes a hysteresis circuit to remove noise in the analog signal 40. The generator's output is a square wave, also called a digital pulse train 18.

In FIG. 3, this digital output 42 appears below the analog waveform 40. For each full commutation pulse, the digital output 42 either changes from a high level to a low level, or from low to high. The digital output 42 is directed to the controller 22 that counts the number of commutation pulses to determine the position of a vehicle accessory connected to the motor 10.

FIG. 3 shows a long high period 50 in the digital pulse train 42 at about sample #300. This is a typical example of a frequent cause for missing pulses. One can observe from the analog waveform 40 that the negative slope of the motor current decays from its initial peak 46 to its steady-motion value 48 masking out the shape of a commutation pulse causing the commutation pulse detection circuit to miss this pulse.

However, according to this embodiment of the present invention, this missing pulse can be deduced by a routine in the controller 22. By repeatedly measuring time periods between commutation pulses, the controller 22 can determine when a pulse may have been missed and then count the missing pulse.

Figure 4:
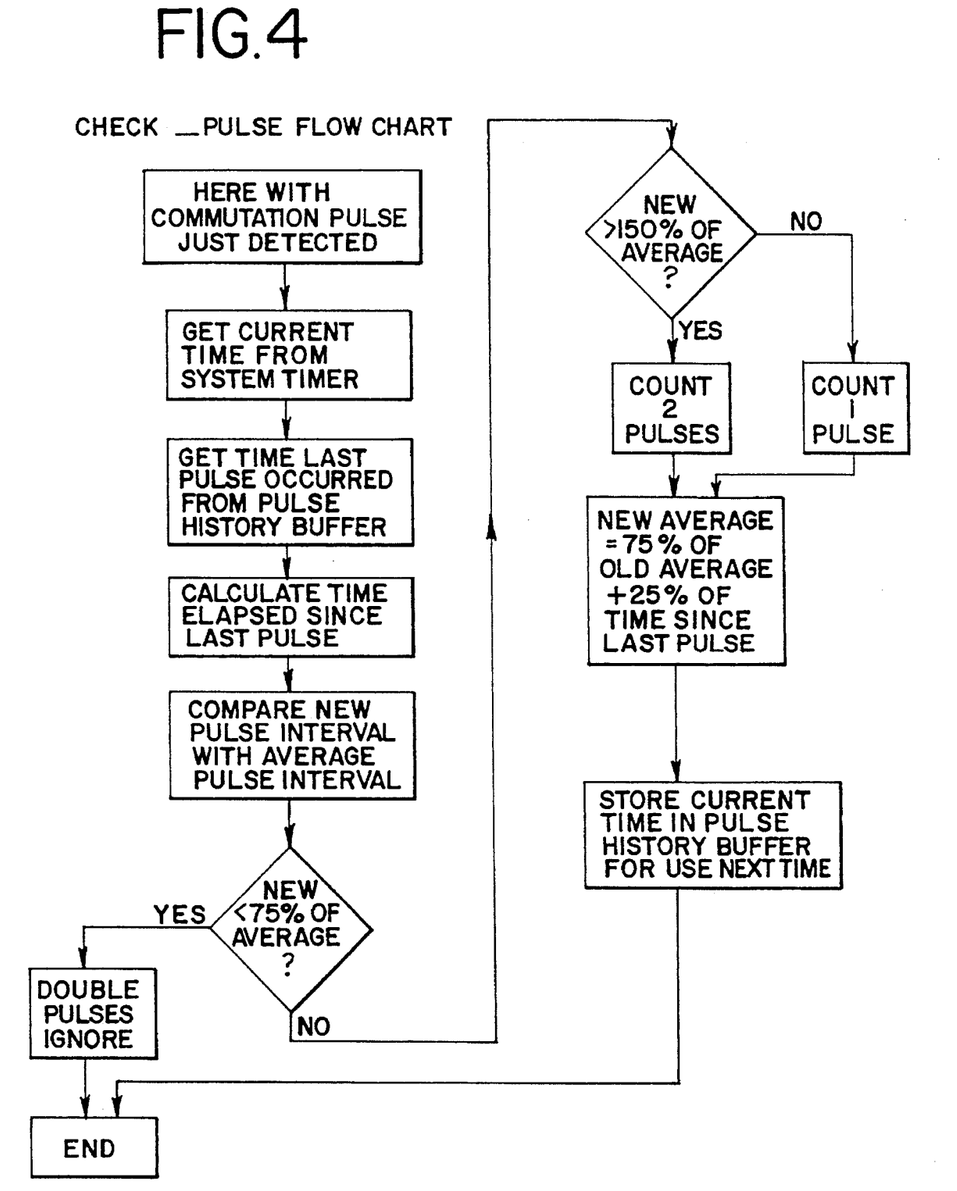
FIG. 4 is a flowchart providing a high level diagram of the logic involved in the controller 22 of FIG. 1.

As shown in FIG. 4, after each commutation pulse is detected, at step 701, the elapsed time of a new pulse interval is calculated by subtracting the time the last pulse occurred from the current time, as indicated at steps 702–705 of FIG. 4. Next, the elapsed time of the new pulse is compared to an average pulse interval. If the new pulse interval is greater than 150% of the average pulse interval, at step 706 the CHECK-PULSE routine counts two pulses to compensate for a missing pulse, at step 707; otherwise, the routine only counts one pulse, at step 708. The controller 22 then calculates a new average pulse interval, at step 709 and then stores the current time in a pulse history buffer for use the next time the CHECK-PULSE routine is executed, at step 710.

Note that the routine represented in FIG. 4 is responsive to the average motor current, not to any specific fixed value of motor running current. Thus, the routine automatically adjusts to manufacturing variations between individual motors and mechanisms and also to variations caused by ambient temperature changes and mechanism aging.

Figure 5:
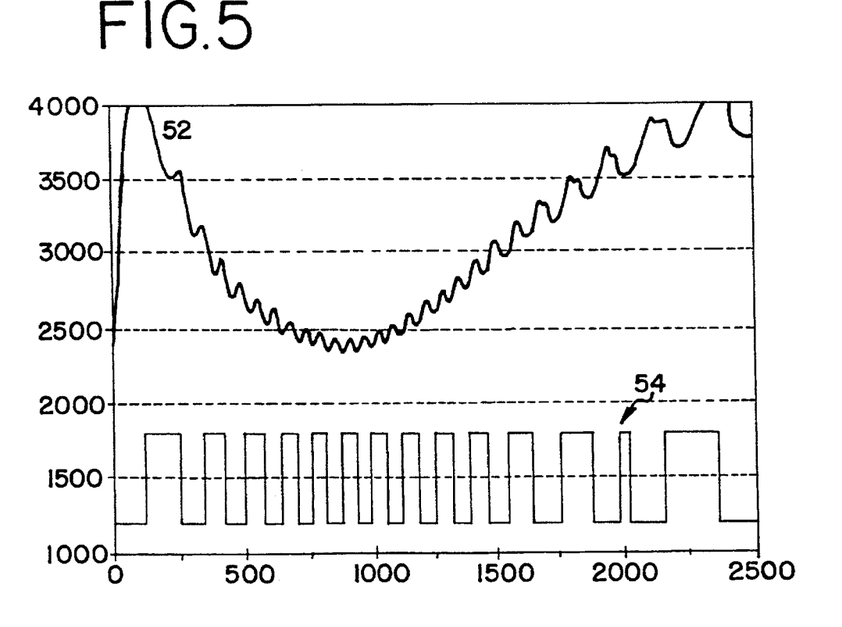
FIG. 5 is a graph of a commutation waveform and a digital pulse train that demonstrates the double pulse phenomenon.

FIG. 5 shows a commutation waveform 52 containing a double pulse problem encountered in some motors. Specifically, FIG. 5 shows a double pulse 54 around sample 2000 that may be caused by a slight misalignment of the motor brushes to the commutator contacts when the motor 10 is under a heavy load. In FIG. 5, the average current decreases after an initial inrush and then starts to rise again causing a double pulse problem.

By the time the controller 22 encounters the double pulse, the motor 10 is moving relatively steadily so when two pulses occur that are about twice as short as usual, the controller 22 may count them as one pulse. The controller 22 compensates for double pulses using a routine, such as the CHECK-PULSE routine shown in FIG. 4.

As shown in FIG. 4, after each commutation pulse is detected, the elapsed time of the new pulse interval is calculated by subtracting the time of the last pulse from the current time. Next, the elapsed time of the new pulse is compared to the average pulse interval. If the new pulse interval is less than 75% of the average pulse interval, the CHECK-PULSE routine determines that a double pulse has occurred and therefore ignores this extra pulse.

For a multi-axis system, another feature shown in FIG. 2 is a motor cross-talk reduction system whose purpose is to counteract the tendency for voltage fluctuations on the VB (+12 V) supply line to interfere with the commutation pulse detection system. Without this feature, the unsuppressed current surge generated by each motor as it starts and stops could cause voltage fluctuations on the battery feed line sufficient to interfere with commutation pulse detection circuitry on other motors in the multi-axis system.

The anti-cross-talk system comprising amplifier U18 is an AC coupled differential amplifier which develops a momentary output pulse that is proportional to a change in the voltage across the rear motor. The output of amplifier U18 is coupled via resistor R108 to transformer T3. When the voltage applied to the motor is constant, amplifier U18 has no effect on the commutation pulse waveforms appearing across the secondary winding of transformer T3.

However, when the voltage across the motor changes, amplifier U18 develops a signal opposite in polarity to that induced by the primary winding of transformer T3, counteracting the tendency of those voltage changes to interfere with commutation pulses detection. While the frequency response of transformer T3 (together with capacitor C104) is chosen to match the frequency of the motor's commutation pulses, the frequency response of the anti-cross-talk system comprising amplifier U18—determined largely by the values of resistors R146 and R148 and capacitors C130 and C134—is chosen to match the time constant of the motor winding, determined by the ratio L/R (inductance (L) divided by resistance (R)).

Figure 6:
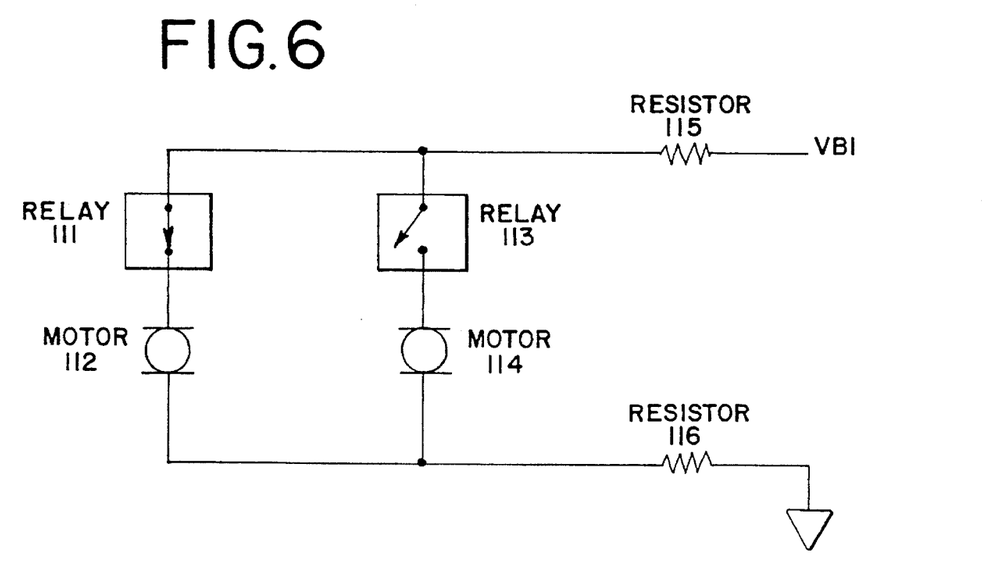
FIG. 6 is a schematic circuit for a multi-axis automotive accessory demonstrating cross talk.

The corrective action of the cross talk reduction circuit disclosed above may be insufficient to prevent commutation pulse inaccuracies in certain cases. Referring to FIG. 6, assume that the contacts of relay 111 are closed, providing VBATT (battery power) to motor 112, which is running continuously and providing commutation pulses as previously described. Relay 113 is initially off, so motor 114 is initially off. Resistors 115 and 116 represent the effective resistance of the wiring harness between the battery and the motorized automotive accessory.

Figure 7:
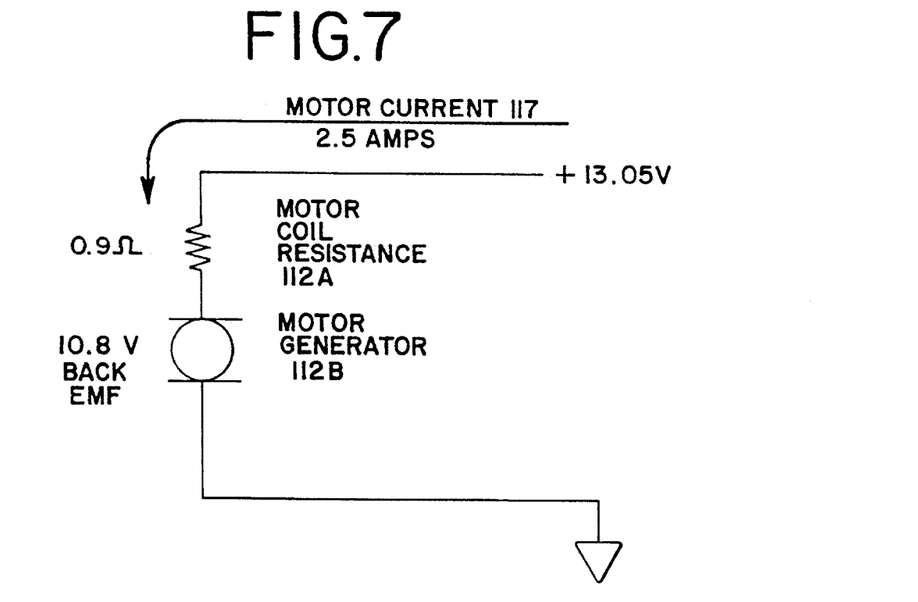
FIG. 7 is a schematic circuit representing one motor circuit from FIG. 6.

Referring to FIG. 7, motor 112 is redrawn as two component parts: as resistor 112A, representing the DC resistance of the motor's coil, in series with motor generator 112B, representing the fact that the motor acts as a generator when in motion. Using values which are representative of a typical automotive accessory, FIG. 7 shows an effective supply voltage of +13.05 volts; a coil resistance 112A of 0.9 ohm; and a steady running motor current 117 of 2.5 amperes. Resistor 112A effectively drops 2.25 volts (0.9 ohm times 2.5 amperes), so that the back −EMF generated by the motor generator 112B is 10.8 volts, adding up to the VBATT level of 13.05 volts.

Referring again to FIG. 6, assume that while motor 112 is still energized by relay 111, relay 113 is now actuated, turning on second DC motor 114. As motor 114 is first turned on, and has not yet started to move, it is not yet generating back −EMF, and a large initial current surge is drawn by motor 114. Assuming that motor 114 has a coil resistance of 0.9 ohm (like motor 112); that the battery supplies +13.8 volts; and that resistors R115 and R116 (representing the effective resistance of the wiring harness) each have a resistance of 0.15 ohm, the initial peak inrush current through motor 114 will be approximately [13.8 volts/(0.9 ohm+0.15 ohm+0.15 ohm)] or 11.5 amperes. This motor 114 inrush current flows through resistors 115 and 116, which have a total resistance of 0.3 ohm, producing a voltage drop of [11.5 amps×0.3 ohms] or 3.45 volts.

This voltage drop reduces the effective supply voltage available to both motor 112 and motor 114 to [13.8 volts− 3.45 volts] or 10.35 volts. Note that this reduced effective supply voltage is now slightly smaller than the back −EMF generated by motor 112. If this reduced motor voltage level were to persist for a substantial time, for example, ten seconds, motor 112 would slow down and reach a new steady running current and a new steady running back −EMF voltage. However, motor 112 has significant mechanical inertia, due to the rotation of its rotor, and cannot instantaneously reduce its speed or, consequently, its back −EMF.

As the effective supply voltage available to motor 112 drops down close to the back −EMF value still being generated by motor 112, the current through motor 112 drops toward zero amperes (and may reach a negative value). As motor current declines, the amplitude of the commutation pulses also diminishes, ceasing entirely when motor current falls to zero amperes. This loss of commutation pulses might last for 50 to 150 milliseconds, until motor 114 starts to move; starts generating back −EMF; reduces its current draw; and stops reducing the effective supply voltage available to motor 112 due to the voltage drop across resistors 115 and 116.

This loss of commutation pulses may be countered by providing heavy-gauge wiring between the battery and the automotive accessory, reducing the effective wiring resistances represented in FIG. 6 by resistors R115 and R116. However, heavier wiring and associated connectors are costly, and furthermore a partially discharged or cold battery can exhibit higher internal resistance, which has an undesirable effect equivalent to high resistance in the wiring. Therefore it is desirable to provide a countermeasure to any temporary drop-out in the commutation pulses produced by one motor, when another motor in the system is actuated.

Figure 8:
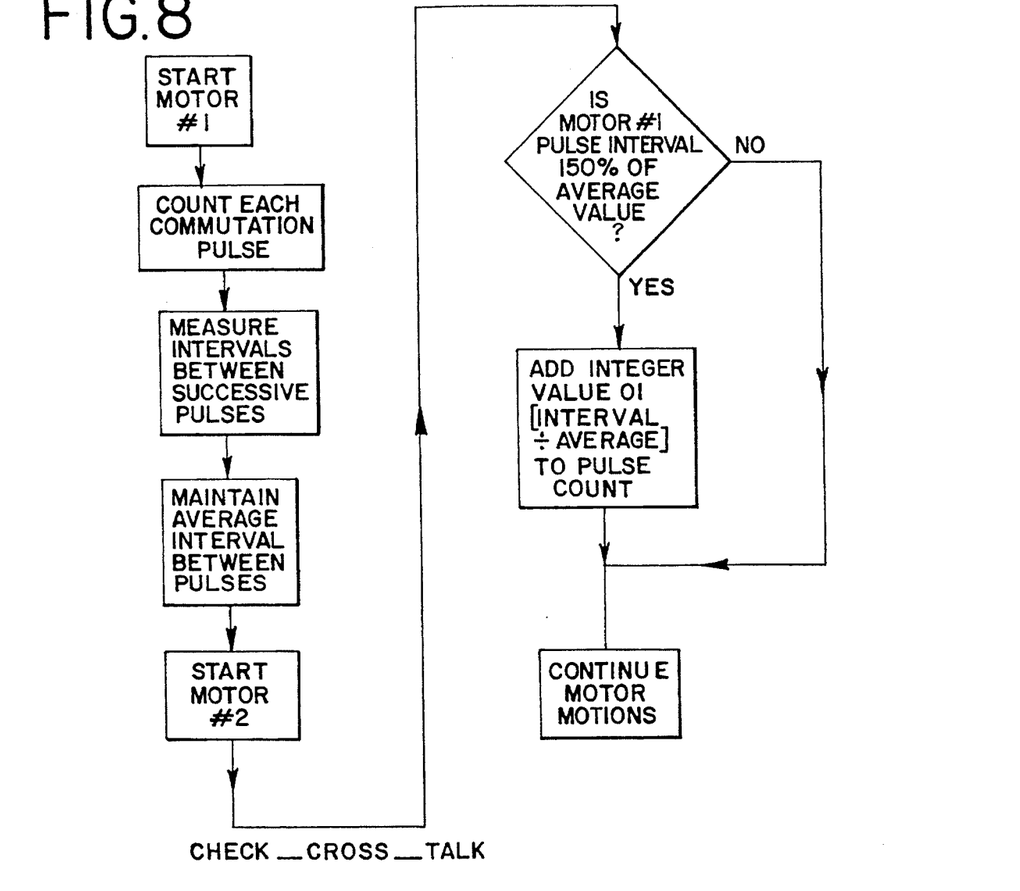
FIG. 8 is a flow chart of a multi-axis routine to check cross-talk in a circuit as shown in FIG. 5.

FIG. 8 shows a routine CHECK-CROSS-TALK incorporated in the controller 22 which can interpolate any missing pulses caused by "cross-talk" between motors. By repeatedly measuring time periods between pulses generated by motor #1, at steps 719 and 720 the CHECK-CROSS-TALK routine develops an average pulse time interval for motor #1, at step 721. When controller 22 actuates motor #2, at step 722 it checks for any unusually long interval in pulses from motor #1, at step 723. If any such is detected, the routine interpolates the missing pulse(s) by adding to its pulse count an adjustment equal to the integer value of the long interval time, divided by the average interval time, at step 724. Multiple copies of routine CHECK-CROSS-TALK are run in a multi-axis automotive accessory, protecting the accuracy of the pulse count for each motor from disturbances caused by the actuations of other motors in the system.

Figure 9:
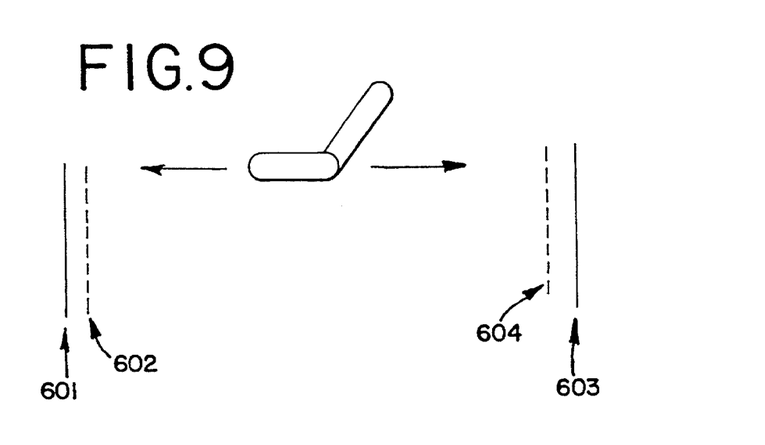
FIG. 9 is a diagram illustrating how soft stop positions are located to reduce wear on the motor and mechanism.

FIG. 9 illustrates a soft-stop feature, as applied to a motorized seat system. When the seat is moved to its full forward position 601, the motor stalls at the end of its track. The motor stall condition is detected by a significant increase in motor current, a significant drop in the frequency of commutation pulses, or both. The controller 22, having kept a count of commutation pulses, calculates the relative seat position at point 601 in terms of commutation pulses, subtracts a suitable offset value, and stores the commutation pulse count which represents point 602 in its memory.

Thereafter, when commanded to move the seat full forward, the controller 22 will automatically stop the seat at soft-stop 602, avoiding the strain on the motor and mechanism that would be caused by a system that ran all the way to end-point 601 since the motor 10 would stall at the mechanical end of travel. Likewise, the controller 22, upon detecting full rearward end-point 603, creates soft-stop 604 to protect the motor and mechanism when the accessory is moved in that direction.

A second embodiment of the present invention relates to improved control of vehicle accessories such as a sunroof or window by analyzing commutation waveforms. The second embodiment will now be described in detail below.

Figure 10A:
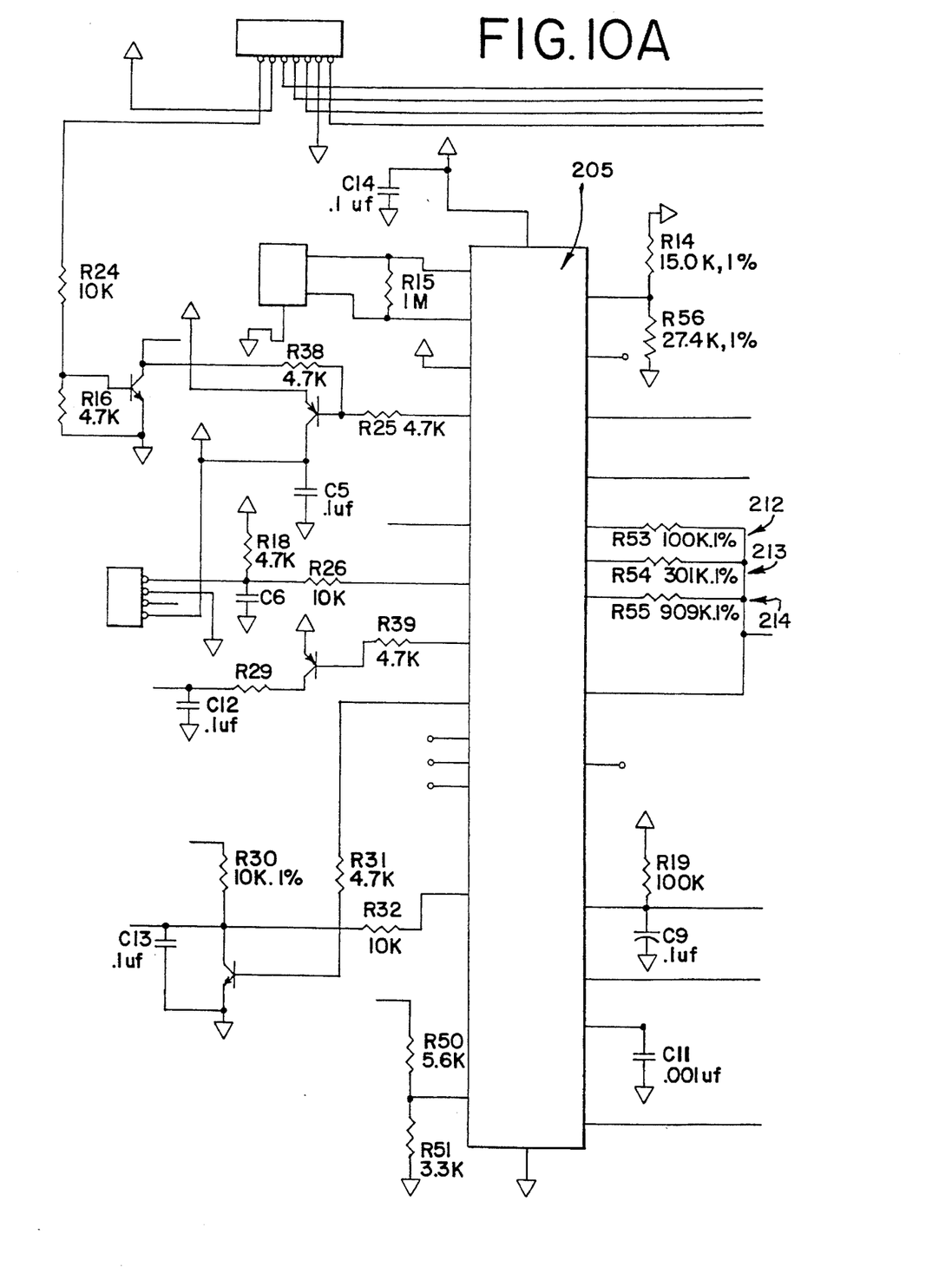
FIG. 10 is a schematic circuit showing details of the current detector 12, comparator 16 and amplifier 14 from FIG. 1.
Figure 10B:
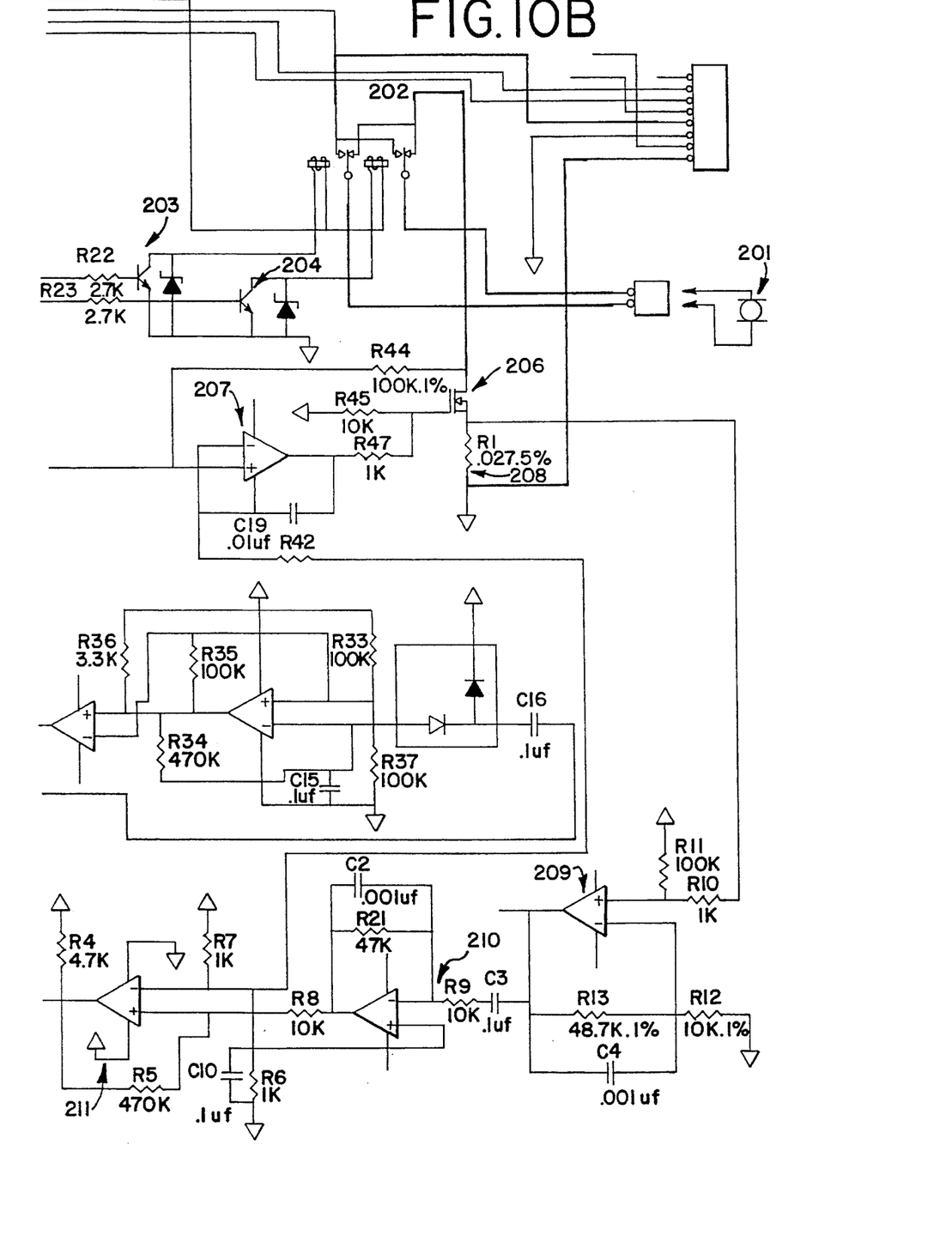

FIG. 10 shows a complete electronic control unit embodiment for a single-axis motorized automotive accessory such as a motorized sunroof. The motor 201 is energized by relay 202, whose two coils are controlled by drive transistors 203 and 204, which in turn are actuated by microcontroller 205. In the preferred embodiment, microcontroller 205 is a Motorola 68HC05P9, but it could also be any of a number of similar devices that are commercially available. When motor 201 is actuated by relay 202, motor current flows through a transistor 206 and a sense resistor 208.

Transistor 206 is initially turned fully on by an amplifier 207 as the motor 201 is first actuated so that transistor 206 has a negligible effect on the motor current during this initial stage. Motor current flowing through the sense resistor 208 produces a voltage drop that is directly proportional to motor current; this voltage is connected to an operational amplifier 209. The output voltage from amplifier 209 is connected to analog input ANØ of microcontroller 205. The microcontroller 205 uses internal analog to digital converter circuitry to develop a digital value representing the total amount of current flowing through the motor 201.

The output of amplifier 209 is also capacitively coupled to an amplifier 210, which generates at its output amplified pulses corresponding to changes in current through motor 201. These amplified pulses in turn are passed to comparator 211, whose output switches low and high as its input swings above and below a preset threshold. A resulting digital waveform, representing motor commutation pulses, passes to a TCAP (timer capture) input of microcontroller 205, which detects signal transitions, counts motor commutation pulses, and precisely measures the elapsed time between motor commutation pulses.

It will be appreciated from the foregoing that in this embodiment microcontroller 205 can both measure the total absolute amount of current through the motor 201, at its ANØ input, and also can measure the quantity and timing of small variations in the motor current, at its TCAP input. This dual detection scheme is utilized to provide improved obstruction detection, as described further below.

Microcontroller 205 provides for digital output signals PA3, PC2, PC1, and PC0 each of which is settable through software to a high (+5 volts), low (0 volts), or off (high-impedance) output state. When signal PA3 is high, amplifier 207 is turned full on, and transistor 206 is in turn switched full on. Signals PC2, PC1, and PC0 are connected through resistors 212, 213, and 214, each resistor having a different resistance value, to amplifier 207. When signal PA3 is off, signals PC2, PC1, and PC0 can be switched high, low, or off by the microcontroller 205 to produce any of 27 different voltage levels at the input of amplifier 207. When transistor 206, responsive to amplifier 207, is set through this control means such that it is not turned fully on, transistor 206 limits the amount of current flowing through motor 201, thereby providing slow-speed motor operation as described further below.

Figure 11A:
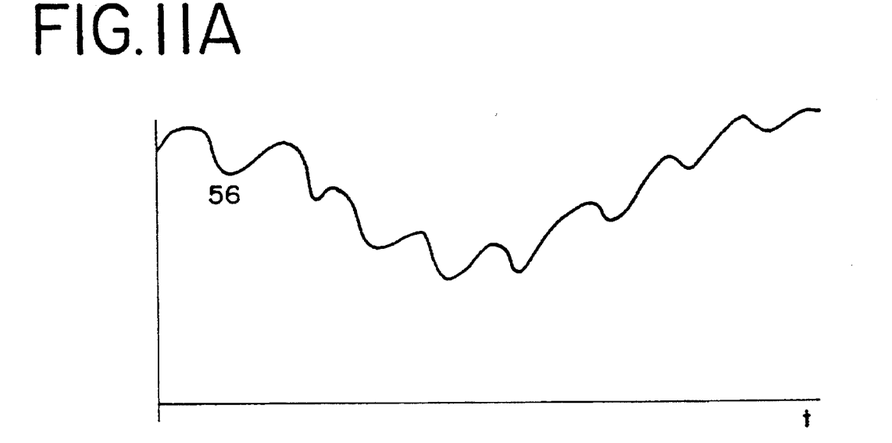
FIGS. 11A, 11B, and 11C and 11D are graphs showing a commutation waveforms and demonstrates the use of synchronous pulse detection to derive motor current load information in an accurate and timely manner deriving a digital pulse train from said waveform.
Figure 11B:
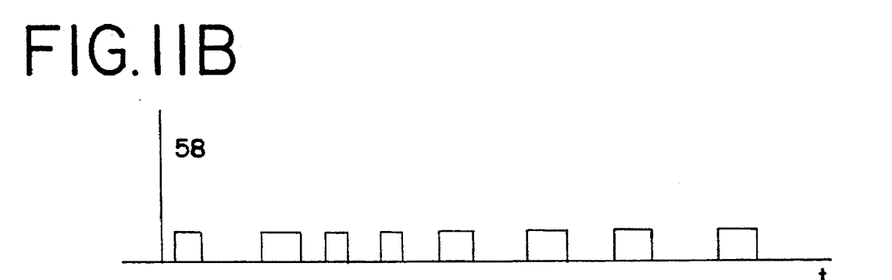
Figure 11C:
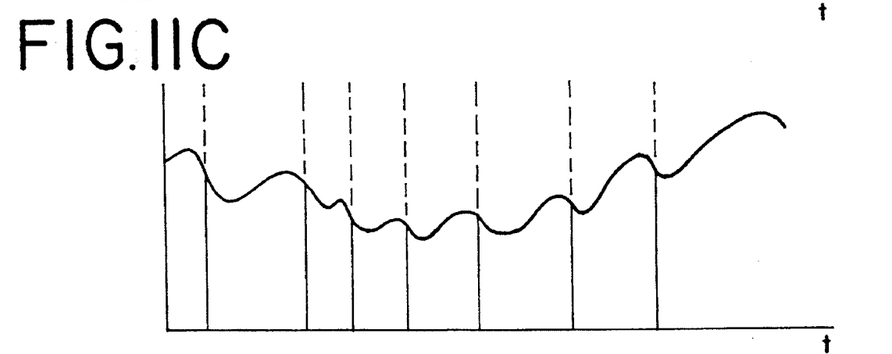

FIGS. 11A–11D show example commutation pulse detection waveforms and illustrate a method of performing obstruction detection. In FIG. 11A, a rise in the average level of the waveform 56 is due to an obstruction to motor motion, which resists the action of the motor, causing the average motor current to increase. The control system must detect this rise in current, so that it can take action to prevent injury, for example, by reversing or stopping the motor which was starting to close a window on a person's hand.

However, a problem arises inasmuch as the instantaneous variations in motor current during normal operation are about the same order of magnitude as the more gradual variation caused by an obstruction. One method of removing the instantaneous variations, leaving only the gradual increase, would be to filter the waveform in FIG. 11A to remove the instantaneous variations, that is, to introduce an analog delay element (such as a capacitor) to the hardware or a digital delay element (such as an averaging routine) to the software. However, any such filter could substantially delay the availability of the information that the average current is increasing, because a filter designed to remove variability with a characteristic frequency equal to the frequency of the commutation pulses must necessarily delay the information on absolute motor current by a time period equal to at least several commutation pulses.

In a preferred method, a digital pulse train 58 is generated from the analog commutation waveform 56 using a current sensor 12, amplifier 14, and comparator 16 as shown previously. This digital pulse train 58 has the same period and frequency as the analog commutation current waveform 56. Next, the commutation waveform is sampled at the same point on each cycle of the waveform, such as sampling on the descending edge of each pulse of the digital pulse train 58 shown in FIG. 11B.

In this manner, the variations in the commutation current waveform can be factored out. As can be seen by inspection of FIG. 11B, by sampling the analog waveform of FIG. 11A synchronously, at consistent points defined by the digital waveform of FIG. 11B, variability due to commutation pulses is removed. The resulting samples accurately track changes in motor current, but without introducing additional motor current detection delays. Changes in motor current occurring over a time period equivalent to a single commutation pulse can be detected. The resulting prompt response to a change in motor load enables the system to quickly detect an obstruction.

Figure 11D:
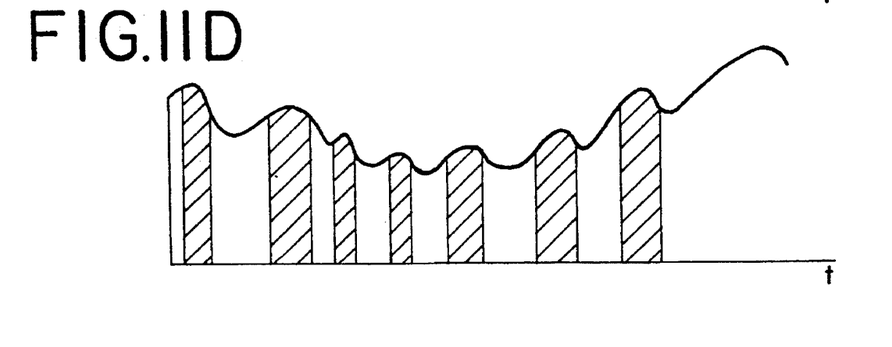

Alternatively, the commutation waveform 56 may be integrated over the period defined by the two edges of a pulse in the digital pulse train 58 shown in FIG. 11D. Integration may be performed with analog circuitry or preferably directly from the waveform digitally. The output of this integration method eliminates transient spikes or other noise that may occur in the commutation waveform shown in FIG. 11A.

An alternative to deriving a digital pulse train from the commutation waveform 56 is to locate separate sensors on each pole of the electric motor 10. These sensors may be optical sensors, Hall effect sensors, or some other type. The separate sensors should be located at positions on the motor corresponding to the winding poles of the motor. The sensors should trigger from the movement of the motor across the poles. The sensors reduce the likelihood of transient pulses or other noise and provide fixed positions in each commutation cycle for sampling the total motor current. The output from using such a sensor would be similar to that shown in FIG. 11D.

Figure 12:
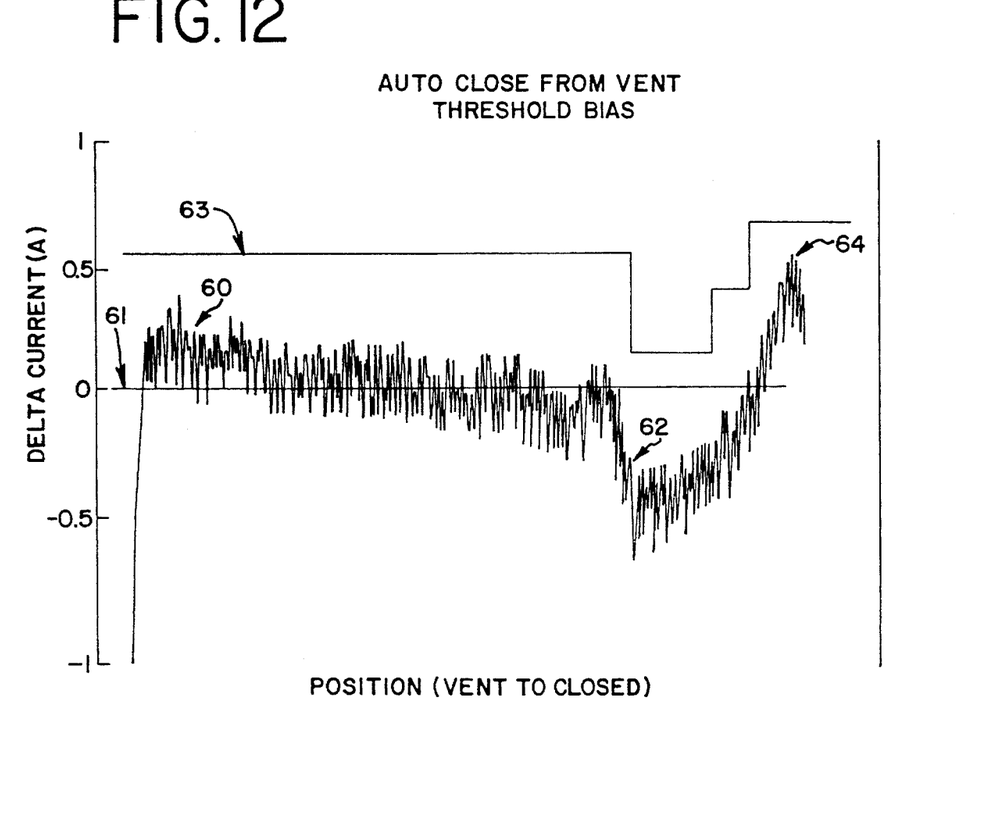
FIG. 12 is a graph of current versus position of a commutation pulse waveform for the motor 10 of FIG. 1 driving an automobile sunroof accessory.

FIG. 12 shows a specially derived commutation waveform 60 for a motor 10 controlling a sunroof accessory in an automobile. The horizontal axis of FIG. 12 represents position as the sunroof is moved from a VENT position to a CLOSED position. Waveform 60 represents threshold bias, TB, defined as [TB=I(INST)−I(AVG)], where I(INST) is the instantaneous motor current, and I(AVG) is the average motor current as derived by microcontroller firmware using a digital filter (Z transform technique) over the last N samples, where N is a constant, for example, 256, that is chosen to match the dynamics of the electromechanical system.

If the motor current were absolutely steady, it would follow the horizontal median line 61. If the motor current varied slowly, the waveform would still follow median line 61. A current above median line 61 represents a current higher than the average, while a current below median line 61 represents a current lower than the average. Median line 61 does not represent any particular absolute motor current value.

The rapid spike-like variations in waveform 60 over the left half of FIG. 12 represent instantaneous current changes due mainly to commutation pulses. A decline in motor current at 62 occurs for this particular type of sunroof when the vent moves down, assisted by gravity. Thereafter average motor current increases as the sunroof moves toward the CLOSED position, reaching a maximum at 64 as the sunroof seals closed.

An obstruction to motor motion encountered at any point in waveform 60 would cause motor current to rise above the normal level. However, as shown in FIG. 12, in a typical automotive accessory there is often substantial variability in motor current due solely to normal variations in current as the accessory runs through its normal sequence. Therefore, a preferred embodiment of this invention defines a boundary line 63, representing the amount by which motor current must exceed the average for an obstruction to be sensed.

As shown in the right half of FIG. 12, boundary line 63 has been defined with varying thresholds, depending on the present portion of the operating cycle of the mechanism. The controller 22, using commutation pulse counting to detect mechanism position, then sets boundary line 63 to a proper value for the present mechanism region. If motor current exceeds boundary line 63, then an obstruction is sensed. The controller 22 would respond by either stopping, or both stopping and reversing, the motor 10. A high load on the motor 10 could correspond to an obstruction in the path of the accessory such as a child's hand. Thus, detecting unexpected current deviation provides a useful safety feature for automobile accessories.

Figure 13A:
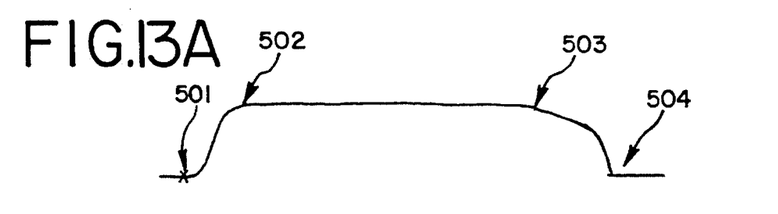
FIGS. 13A and 13B are graphs of motor speed versus time showing the benefit of motor slow-down circuitry in increasing obstruction detection sensitivity.

FIG. 13 illustrates the benefits of being able to slow down the motor of an automatic accessory using a circuit such as that previously described in FIG. 10. FIG. 13A shows the speed of a motor without slow-down. At 501 the motor is turned on; speed rises rapidly until it reaches steady running speed at 502. At point 503 an obstruction is detected through an obstruction detection system as previously described.

Even if the obstruction detection system is very fast, and the controller shuts off the motor almost immediately after 503, the inertia of the motor and the mechanism of the automotive accessory is substantial, and it takes until point 504 for the system to come to rest. This delay may make it difficult for the system to react with sufficient sensitivity and speed to an obstruction, for example, to avoid pinching a child's fingers while closing a sunroof or window in the region just before the sunroof or window reaches the fully closed position.

Figure 13B:
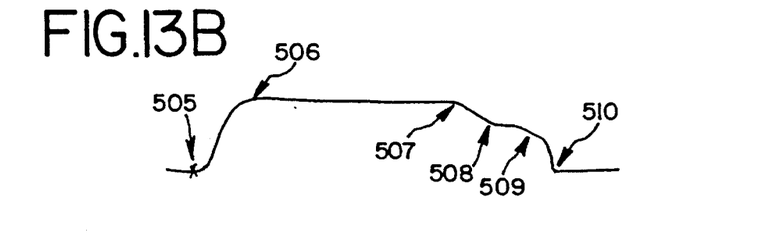

FIG. 13B illustrates the speed of the motor through a similar sequence except with motor slow-down. At 505 the motor starts, and at 506 the system is moving at normal running speed. The controller 22 counts commutation pulses to determine position, and at point 507 determines the accessory is moving close to the zone where increased obstruction sensitivity is required, and so starts reducing the running speed of the system. By point 508 the motor is running steadily at a reduced speed, substantially reducing inertia; for example, if the motor is running at 50% of normal running speed, inertia is only 25% of normal. When an obstruction is then detected at point 509, the time needed to stop the motor at point 510 is substantially reduced, as compared to the interval between 503 and 504 in FIG. 13A. Thus, the system advantageously provides increased obstruction detection by using a motor slowdown routine.

It is intended that the foregoing detailed description be regarded as illustrative rather than limiting and that it is understood that the following claims including all equivalents are intended to define the scope of the invention.

We claim:

1. A control system for use with a bidirectional motor connected to a motorized vehicle accessory to move said accessory a distance from a first position to a second position, said control system comprising:

(a) a detector responsive to control signals emitted by said motor during rotation, said control signals indicative of an amount of rotation of said motor;

(b) a memory; and (c) a controller responsive to said memory and said detector, and providing an output signal to said motor for operation thereof as a function of a relationship between said distance and said control signals, said controller further including:

a routine for applying an adjustment factor to said output signal to correct for inaccuracies in detection of said control signals.

2. The control system of claim 1, wherein said memory includes information indicative of said first position.

3. The control system of claim 2, wherein said controller includes a microprocessor.

4. The control system of claim 2, wherein said motor includes a fixed number of poles;

said memory includes data indicative of said second position, and a position recall routine responsive to said data from said memory for rotating said motor through a number of motor poles to move said accessory to said second position; and wherein said routine evaluates said control signals to determine when a commutation pulse may have been missed and when an extra commutation pulse may have been detected for reducing error accumulation in a position of said accessory stored in said memory.

5. The control system of claim 4, wherein said memory and said controller comprises a microprocessor.

6. The control system of claim 1, wherein said detector comprises a current detecting resistor in series with said motor and an amplifier electrically connected to said current detecting resistor.

7. A control system for engaging a bidirectional motor to manipulate an accessory over a bidirectional travel path in a motorized vehicle, comprising:

(a) a sensor for detecting a commutation waveform corresponding to current passing through said motor;

(b) a comparator for deriving a digital pulse train from said commutation waveform;

(c) a memory for receiving and storing data representative of said commutation waveform and said digital pulse train, said memory including a programmed feature; and (d) a controller responsive to said data and said feature, said controller providing an output signal to control said motor.

8. The control system of claim 7, wherein said feature includes an obstruction detection routine for stopping said accessory by controlling said output signal to said motor when an unexpected load on said motor is detected by said routine.

9. The control system of claim 8, wherein said feature includes a motor slow down routine to slow down said motor when said accessory's position approaches an end of said travel path, thereby providing increased obstruction detection sensitivity.

10. The control system of claim 7, wherein said feature includes a soft stop routine to slow down said motor when said accessory approaches an end of said travel path and to gently stop said accessory at said end of said travel path, thereby reducing wear on said motor.

11. The control system of claim 7, wherein said feature includes a missing pulse routine and a double pulse routine responsive to said commutation waveform for reducing error accumulation over time by correcting a position of said accessory stored in said memory.

12. The control system of claim 7, wherein said accessory is selected from the group consisting of a window, a mirror, a seat, and a sunroof.

13. The control system of claim 7, wherein said comparator comprises a device for toggling a digital output when the first derivative of said commutation waveform changes from a positive to a negative value, and a noise reduction device to remove noise from said commutation waveform.

14. The control system of claim 7, wherein said system includes a plurality of motors and said output signal is modified by a motor cross-talk limiting system coupled to said sensor for reducing inrush current surges generated by other motors in the control system when said other motors start and stop.

15. A control system for engaging a bidirectional motor to manipulate an accessory over a bidirectional travel path in a motorized vehicle, comprising:

(a) a sensor for detecting a commutation waveform corresponding to current passing through said motor;

(b) a detector for generating a digital pulse train from said motor, said detector including a device for sensing pole crossings located near at least one pole of said motor;

(c) a memory for receiving and storing data representative of said commutation waveform and said digital pulse train, said memory including a programmed feature; and (d) a controller responsive to said data and said feature, said controller providing an output signal to control said motor.

16. The control system of claim 15, wherein said detector includes one of an optical sensor and a hall effect sensor.

17. A control system for controlling a motorized vehicle accessory including at least one motor operable from a d.c. power source for adjusting said accessory, and a memory for storing a plurality of positions of said accessory, the control system comprising:

(a) a sensor for detecting current supplied from said d.c. power source to said motor;

(b) a generator for generating a signal indicative of a position of said accessory from current fluctuations in a supply line from d.c. power source to said motor during an adjustment in said position of said accessory; and (c) a controller including a first routine for monitoring said signal for conditions indicative of an obstruction in a path of said accessory based upon a rate of change of said current fluctuations relative to said position and a second routing to send an output signal to said motor to stop said accessory thereby providing an automatic safety feature.

18. The control system of claim 17, wherein said controller includes a routine that monitors said signal for conditions that indicate said accessory is close to an end of a traversal path and then sends an output signal to slow down said motor to gently stop said accessory.

19. A method of controlling an accessory of a motorized vehicle including at least one motor operable from a d.c. power source for adjusting a position of said accessory, a memory for storing a plurality of positions of said accessory, and a microcomputer based electronic controller, comprising the steps of:

(a) sensing current supplied from said d.c. power source to said motor;

(b) generating a signal indicative of the position of said accessory from current fluctuations in a supply line from said d.c. power source to said motor during an adjustment in the position of said accessory;

(c) measuring said signal to determine a number of commutation pulses that have been missed and a number of double pulses; and (d) compensating for said number of missing commutation pulses and said number of double pulses to store a corrected data position representing said accessory position into said memory.

20. A method of controlling an accessory of a motorized vehicle including at least one motor operable from a d.c. power source for adjusting a position of said accessory, a memory for storing a plurality of positions of said accessory, and a microcomputer based electronic controller, comprising the steps of:

(a) synchronously sampling current supplied from said d.c. power source to said motor to generate a signal indicative of current fluctuations during an adjustment in the position of said accessory; and (b) monitoring said signal for conditions that indicate an obstruction is in a traversal path of said accessory to stop said accessory.

21. A system for controlling an accessory of a motorized vehicle including at least one motor operable from a d.c. power source for adjusting a position of said accessory, a memory for storing a plurality of positions of said accessory, and a microcomputer based electronic controller, comprising:

(a) means for sensing current supplied from said d.c. power source to said motor;

(b) means for generating a signal indicative of the position of said accessory from current fluctuations in a supply line from said d.c. power source to said motor during an adjustment in the position of said accessory;

(c) means for measuring said signal to determine a number of commutation pulses that have been missed and a number of double pulses; and (d) means for compensating for said number of missing commutation pulses and said number of double pulses to store a corrected data position representing said accessory position into said memory.

22. A system for controlling an accessory of a motorized vehicle including at least one motor operable from a d.c. power source for adjusting a position of said accessory, a memory for storing a plurality of positions of said accessory, and a microcomputer based electronic controller, comprising:

(a) means for generating a signal from current fluctuations in a supply line from said d.c. power source to said motor during an adjustment in the position of said accessory; and (b) means for monitoring said signal for conditions that indicate an obstruction is in a travel path of said accessory to stop said accessory based on comparable portions of said fluctuations.

23. A control system for use with a bidirectional motor connected to a motorized vehicle accessory to move said accessory a distance from a first position to a second position, said control system comprising:

(a) means for detecting control signals emitted by said motor during rotation, said control signals indicative of an amount of rotation of said motor;

(b) a memory including a representative control signal waveform; and (c) a controller responsive to said memory and said detecting means, and providing an output signal to said motor for operation thereof as a function of a relationship between said distance and said control signals, said controller including:

(i) means for comparing said control signals detected by said detecting means to a running average of said control signals, and (ii) means for adjusting said output signal to said motor as a function of said comparison made by said comparing means.

24. A control system for use with a bidirectional motor that generates control signals indicative of an amount of rotation of said motor, said bidirectional motor connected to a motorized vehicle accessory to move said accessory a distance from a first position to a second position, said control system comprising:

(a) a detector responsive to said control signals;

(b) a means for synchronously sampling said control signals with the generation thereof; and (c) a controller responsive to said synchronous sampling means for providing an output signal to said motor for operation thereof as a function of a relationship between said distance and said control signals.

25. The control system of claim 24 wherein said control signals comprise commutation pulse signals.

26. The control system of claim 24 wherein said control signals are output from a sensor located relative to said motor to provide an output indicative of movement thereof.

27. The control system of claim 26 wherein said sensor is an optical sensor.

28. The control system of claim 26 wherein said sensor is a Hall effect sensor.

29. A control system for controlling a motorized vehicle accessory including at least one motor operable from a d.c. power source for adjusting said accessory, and a memory for storing a plurality of positions of said accessory, the control system comprising:

(a) a sensor for detecting current supplied from said d.c. power source to said motor;

(b) a generator for generating a signal indicative of a position of said accessory from current fluctuations in a supply line from said d.c. power source to said motor during an adjustment in said position of said accessory; and (c) a controller for monitoring said signal for conditions indicative of an obstruction in a path of said accessory based upon a rate of change of said current fluctuations relative to said position and sending a signal to said motor to alter operation thereof upon said indication thereby providing an automatic safety feature.

* * * * *